US007934859B2

(12) United States Patent
Bryant et al.

(10) Patent No.: US 7,934,859 B2
(45) Date of Patent: May 3, 2011

(54) LIGHT EMITTING DIODE MODULE

(76) Inventors: Robert Bryant, Victoria (CA); Huston Hill, Victoria (CA); Derek Pettigrew, Iwate (JP)

( * ) Notice: Subject to any disclaimer, the term of this patent is extended or adjusted under 35 U.S.C. 154(b) by 155 days.

(21) Appl. No.: 11/972,004

(22) Filed: Jan. 10, 2008

(65) Prior Publication Data

US 2008/0212309 A1 Sep. 4, 2008

Related U.S. Application Data

(60) Provisional application No. 60/879,778, filed on Jan. 10, 2007.

(51) Int. Cl.
*B60Q 3/04* (2006.01)

(52) U.S. Cl. .............. 362/362; 362/311.02; 362/311.13; 362/311.14; 362/311.15; 362/289; 362/223; 362/217.1; 362/555

(58) Field of Classification Search .................. 362/362, 362/800, 311.02, 311.13–311.15, 289, 223, 362/217.1, 555
See application file for complete search history.

(56) References Cited

U.S. PATENT DOCUMENTS

| | | | | |
|---|---|---|---|---|
| 6,059,676 | A * | 5/2000 | Seymour et al. | 473/570 |
| 7,377,664 | B2 * | 5/2008 | Waters | 362/103 |
| 7,401,935 | B2 * | 7/2008 | VanderSchuit | 362/101 |

OTHER PUBLICATIONS

Black & Decker, "Batteries & Chargers from Black and Decker" (web page), © 2008, 3 pages.

* cited by examiner

*Primary Examiner* — Sandra L. O'Shea
*Assistant Examiner* — William J Carter
(74) *Attorney, Agent, or Firm* — Davis & Bujold, P.L.L.C.

(57) ABSTRACT

A light emitting diode module which includes a hollow enclosed body having a transparent or translucent portion. A power source is disposed within the body. At least one light emitting diode is disposed within the body. The at least one light emitting diode is visible through the transparent or translucent portion of the body. A power circuit couples the at least one light emitting diode to the power source. An externally accessible switch is provided to open and close the power circuit so that the at least one light emitting diode can be turned on and turned off.

3 Claims, 3 Drawing Sheets

LIGHT EMITTING DIODE MODULE

FIELD

The present invention relates to light emitting diode module.

BACKGROUND

It is common for light emitting diodes to be used as a light source in various devices. When this occurs the light emitting diodes and a power source are built into such devices. A number of devices have been designed for use with chemiluminescent light sticks. U.S. Pat. No. 4,695,055 (Newcomb et al 1987) and U.S. Pat. No. 4,878,674 (Newcomb et al 1989) disclose an application relating to a golf ball. To this point substituting light emitting diodes as a light source has required a complete redesign of the product.

SUMMARY

There is provided a light emitting diode module which includes a hollow enclosed body. The body has a transparent or translucent portion. A power source is disposed within the body. At least one light emitting diode is disposed within the body. The at least one light emitting diode is visible through the transparent or translucent portion of the body. A power circuit couples the at least one light emitting diode to the power source. An externally accessible switch is provided to open and close the power circuit so that the at least one light emitting diode can be turned on and turned off.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments show, wherein.

DETAILED DESCRIPTION

Figure 1:
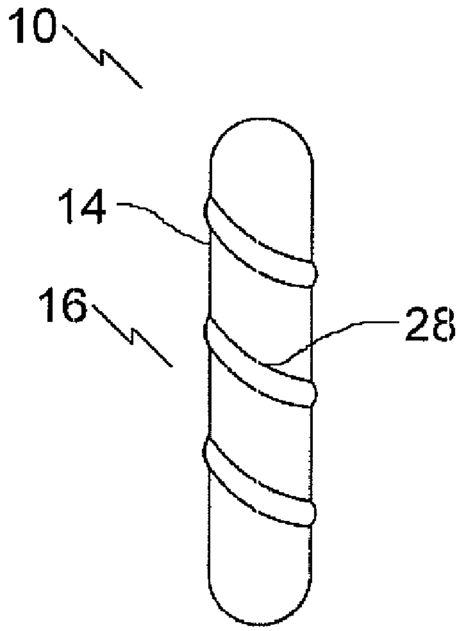
FIG. 1 is a side view in section of a first embodiment of the light emitting diode module.

The preferred embodiment, a light emitting diode module generally identified by reference numeral 10, will now be described with reference to FIG. 1 through 9.

Figure 4:
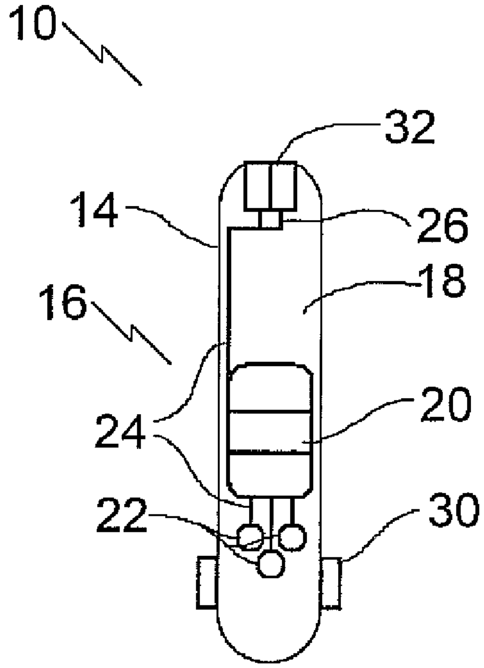
FIG. 4 is a side view of a fourth embodiment of the light emitting diode module.

Structure and Relationship of Parts:

Referring to FIG. 1, module 10 has a hollow enclosed cylindrical body 14. In this particular embodiment, body 14 is sized to substitute for a chemiluminescent light stick. Body 14 has a transparent or translucent portion, generally indicated by reference numeral 16. Referring to FIG. 4, body 14 also has an interior cavity 18. A power source 20 is disposed within interior cavity 18 of body 14. There is at least one light emitting diode 22 disposed within interior cavity 18 of body 14. In the illustrated embodiment, three light emitting diodes 22 have been shown. Light emitting diodes 22 are positioned within interior cavity 18, so that they will be visible through transparent or translucent portion 16 of body 14. A power circuit, as represented by wires 24, couple light emitting diodes 22 to power source 20. An externally accessible switch 26 is provided to open and close power circuit 24 so that light emitting diodes 22 can be selectively turned on and turned off.

Figure 2:
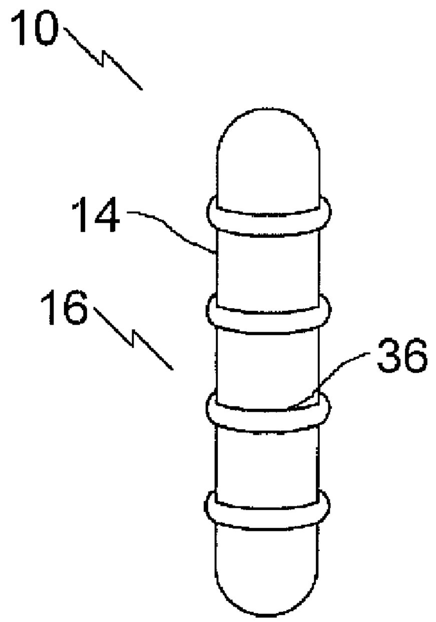
FIG. 2 is a side view of a second embodiment of the light emitting diode module.
Figure 3:
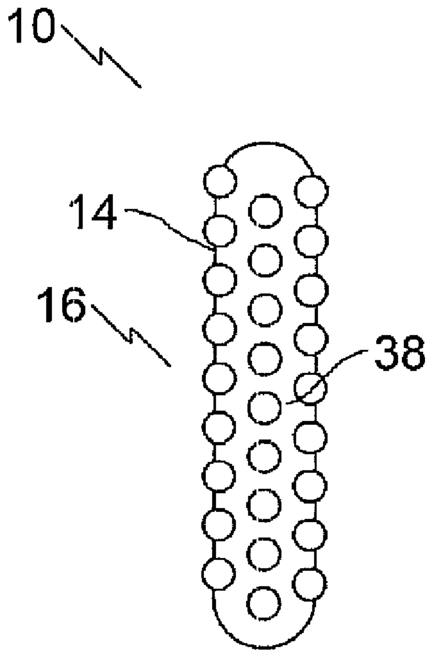
FIG. 3 is a side view of a third embodiment of light emitting diode module.
Figure 5:
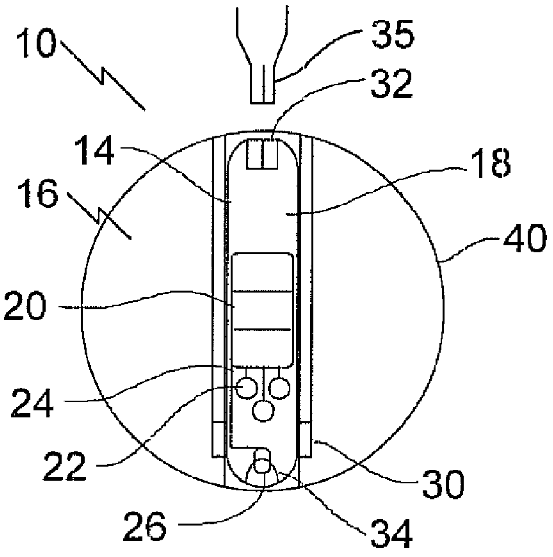
FIG. 5 is a side view, in section, of the fourth embodiment of the light emitting diode module illustrated in FIG. 4, installed in a golf ball.
Figure 6:
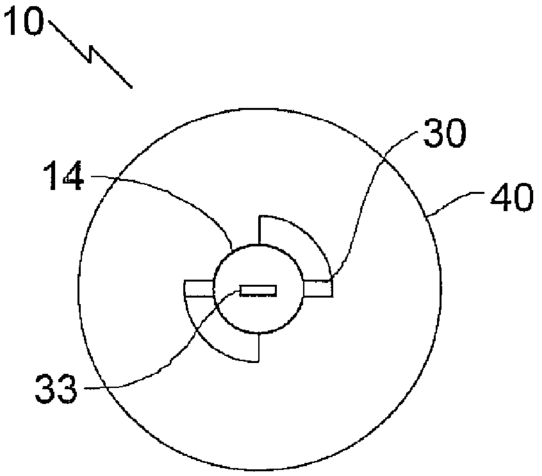
FIG. 6 is a top plan view of the fourth embodiment of the light emitting diode module illustrated in FIG. 4 installed in the golf ball illustrated in FIG. 5.
Figure 9:
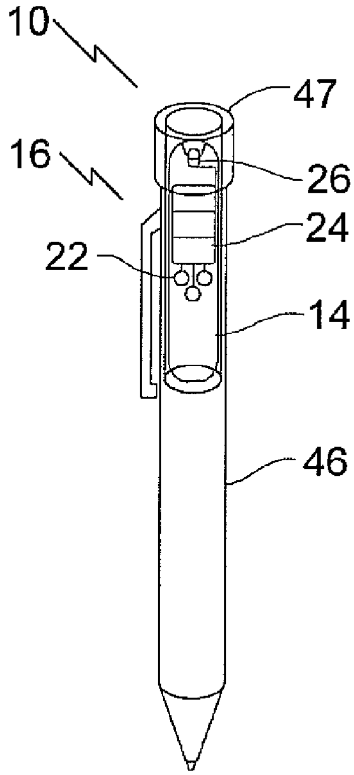
FIG. 9 is a transparent side view of a fifth embodiment of the light emitting diode module installed in a pen.

Referring to FIG. 1 through FIG. 4, it is preferred that body 14 have has an external engagement adapted to secure 14 body within a cylindrical opening (not shown). In FIG. 1, the external engagement is a helical thread 28. The external engagement may also be a friction engagement, such as a series of regularly spaced rings 36 as shown in FIG. 2, or a series of raised bumps 38 as shown in FIG. 3. There are other external engagements that could be used, and it is not practical to attempt to illustrate them all. Referring to FIG. 9, module 10 may not have an external engagement, and may instead be secured within the housing by being enclosed within the housing itself. In this embodiment, the housing is in the form of a pen 46, with a cap 47 securing module 10 within pen 46. Referring to FIG. 4, an alternative external engagement is illustrated in the form of locking pins 30, which extend radially from body 14. A common aspect of helical thread 28 and locking pins 30 is that they are activated by rotation of body 14 about its longitudinal axis. Referring to FIG. 4 and FIG. 5, a tool receptacle 32 is provided at one end of body 14. In FIG. 6, tool receptacle 32 is a square recess 32, adapted to receive a Robertson screwdriver tip. There are other type of tool receptacles, such as a slot adapted to receive a screwdriver blade, that can be used and it is not practical to illustrate them all. On the other hand, the embodiments shown in FIGS. 2 and 3 do not require a tool receptacle, as they do not need to be turned. It is sufficient to push these embodiments in place, and the external engagement will hold them. Referring to FIG. 6, an alternative tool receptacle is illustrated in the form of a slot 33, adapted to receive a screwdriver blade. In each of the illustrated embodiments, switch 26 is recessed from the outer surface of body 14. In FIG. 4, switch 26 is a small rectangular body that underlies a relatively larger square recess that serves as tool receptacle 32. It is preferred that switch 26 be small relative to the tool receptacles, so that switch 26 cannot be triggered by a tool positioned in the tool receptacle for purposes of rotating body 14 about its axis. In FIG. 5, switch 26 is positioned at the opposite end of body 14 to tool receptacle 32. Switch 26 is a small circular body that lies within a small recess 34. Although not illustrated, battery 20 and light emitting diodes would be secured against vibration within interior cavity 18 of body 14.

Figure 7:
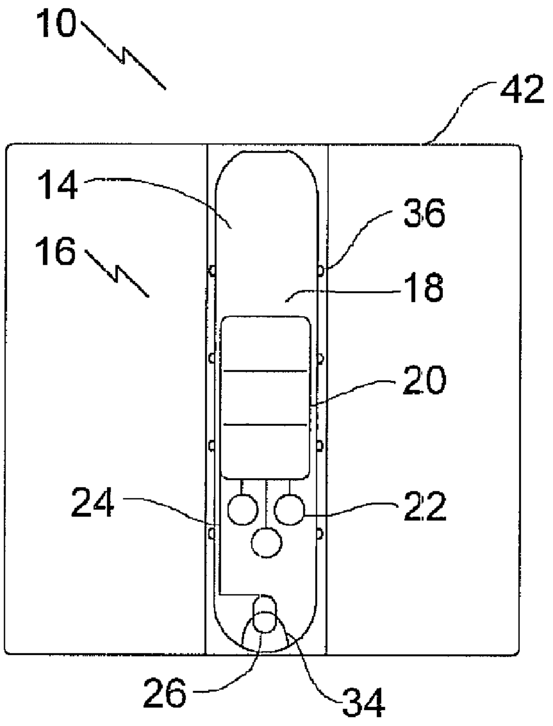
FIG. 7 is a side view in section of the second embodiment of the light emitting diode module installed in an imitation ice cube.
Figure 8:
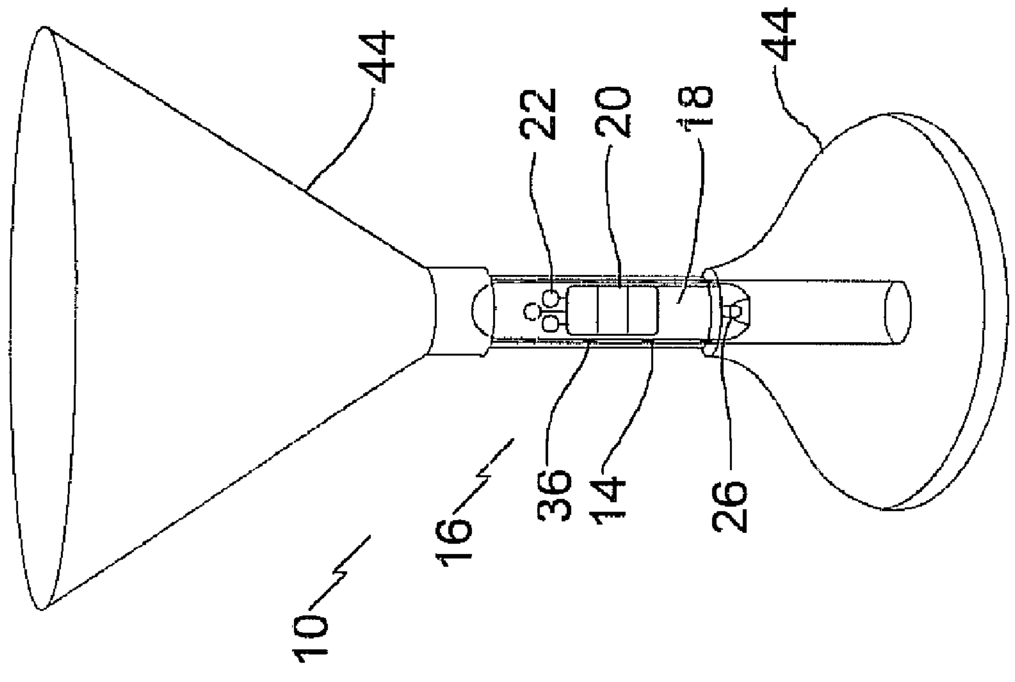
FIG. 8 is a transparent side view of the second embodiment of the light emitting diode module installed in an imitation ice cube.

Operation:

Referring to FIG. 5, in operation, a tool 35 is inserted into square recess 32 or slot 33 shown in FIG. 6. Tool 35 is used to rotate body 14 to secure body 14 in position within a cylindrical opening. Persons skilled in the art are familiar with products having cylindrical openings, from previous use of chemiluminescent light sticks. Different examples of housings that can be illuminated by light emitting diode module 10 are given as examples, such as a golf ball 40 as shown in FIG. 5, an imitation ice cube 42 as shown in FIG. 7, a drinking glass 44 as shown in FIG. 8, or a pen 46 as shown in FIG. 9. Referring to FIG. 4, when one wishes module 10 to be illuminated, a sharp instrument is extended through the tool receptacle to press switch 26. Pressing switch 26 completes power circuit 24 and as a result power is supplied from battery 20 to light emitting diodes 22. Products such as the pen or drinking glass could be designed with a means for activating switch 26 attached to the product itself. If the module were placed inside a pen for example it would be placed so the switch 26 was in contact with the lid 47. The lid 47 would be designed to include an attached tool to press switch 26 in a similar fashion as a current pen by simply depressing a button. This could be the same for many other items like the drinking glass or a lighted coaster for example.

Figure 10:
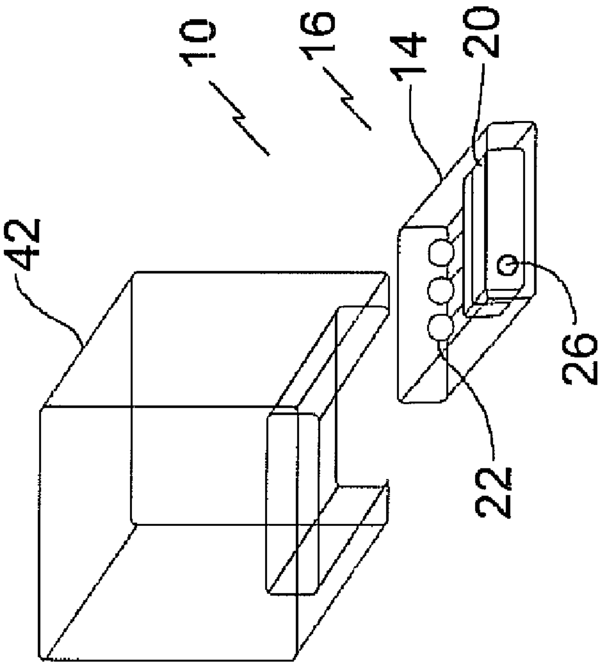
FIG. 10 is a perspective view of a sixth embodiment of the light emitting diode module being installed in an imitation ice cube.

Variations:

Referring to FIG. 10, instead of a cylindrical body, body 14 may also be designed using other convenient shapes, such as a rectangular prism shape, such that body 14 may be inserted and removed as a cartridge into various housing, such as imitation ice cube 42 as depicted.

Advantages:

The LED module is provided so a customer can buy a 'refill' module for an existing product they have already purchased. By offering this module the customer does not have to purchase the product. This makes the product infinitely reusable, as the product does not have to be disposed of after batteries or LEDs have been spent. This makes the products much more environmentally friendly. It also reduces shipping costs. The cost of shipping the 'refill' modules to the customer is far less expensive than shipping a replacement product. This module also helps to save money for the manufacturer and the distributor if there happens to be a defect in the battery or the LED. Defects in the plastic or glass item are relatively easy to spot at the manufacturing stage prior to packaging or shipping but battery and LED defects are not easily recognized prior to the 'customers' use of the product. If a defect is discovered; rather than disposing of the product and then receiving a replacement shipped from the manufacturer or distributor, it would be relatively inexpensive to simply ship a replacement module to the customer or for the distributor to replace defective modules. In summary this LED module has the potential to save time and money at every stage from manufacture to end user and helps create a more environmentally friendly option in an industry that to this point has not been environmentally friendly industry. To this point there has been tremendous waste. A little like throwing a car away, due to engine failure.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A light emitting diode module comprising:

a hollow enclosed cylindrical body defining a longitudinal axis and having a transparent or translucent portion;

a power source disposed within the body;

at least one light emitting diode disposed within the body, and the at least one light emitting diode being visible through the transparent or translucent portion of the body;

a power circuit coupling the at least one light emitting diode to the power source;

an externally accessible tool receptacle positioned at one end of the body on the longitudinal axis, whereby the body is rotatable about the longitudinal axis by a screwdriver tool which is completely independent and separate from the body; and a switch being located adjacent an opposite end of the body from the tool receptacle to open and close the power circuit so that the at least one light emitting diode can be turned on and turned off, the switch being positioned on the longitudinal axis and underlies the tool receptacle such that the switch can only be activated by inserting the tool into the tool receptacle and manipulating the tool in order to activate the switch.

2. The light emitting diode module as defined in claim 1, wherein the switch is small relative to the tool receptacle such the switch cannot be triggered by the tool positioned in the tool receptacle for purposes of rotating the body about its axis.

3. A light emitting diode module comprising:

a hollow enclosed cylindrical body defining a longitudinal axis and having a transparent or translucent portion;

a power source disposed within the body;

at least one light emitting diode disposed within the body, and the at least one light emitting diode being visible through the transparent or translucent portion of the body;

a power circuit coupling the at least one light emitting diode to the power source;

an externally accessible tool receptacle positioned at one end of the body on the longitudinal axis so as to facilitate rotation of the body about the longitudinal axis by a screwdriver tool, which is completely independent and separate from the body; and a switch being located adjacent an opposite end of the body from the tool receptacle and underlying the tool receptacle to open and close the power circuit so that the at least one light emitting diode can be turned on and turned off, such that the switch can only be activated by inserting the tool into the tool receptacle and manipulating the tool in order to activate the switch;

the body having an external engagement adapted to secure the body in a cylindrical opening, and the external engagement being characterized by opposed radially extending locking pins.

* * * * *